(12) United States Patent
Brendel

(10) Patent No.: US 12,315,414 B2
(45) Date of Patent: May 27, 2025

(54) METHOD OF CALIBRATING A BACKGROUND DISPLAY AND RECORDING SYSTEM

(71) Applicant: Arnold & Richter Cine Technik GmbH & Co. Betriebs KG, Munich (DE)

(72) Inventor: Harald Brendel, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 199 days.

(21) Appl. No.: 18/130,524

(22) Filed: Apr. 4, 2023

(65) Prior Publication Data
US 2023/0326385 A1    Oct. 12, 2023

(30) Foreign Application Priority Data

Apr. 8, 2022 (DE) .......................... 102022108578.3

(51) Int. Cl.
*H04N 5/222* (2006.01)
*G09G 3/20* (2006.01)

(52) U.S. Cl.
CPC ......... *G09G 3/2003* (2013.01); *H04N 5/2224* (2013.01); *G09G 2320/0693* (2013.01); *G09G 2340/06* (2013.01)

(58) Field of Classification Search
CPC ............... H04N 5/2224; G09G 3/2003; G09G 2320/0693; G09G 2340/06
See application file for complete search history.

(56) References Cited

U.S. PATENT DOCUMENTS 8,035,688 B2 * 10/2011 Snyderman ............... G01J 3/10
  348/181
8,994,714 B2 * 3/2015 Erinjippurath ........... G09G 3/20
  345/589

(Continued)

FOREIGN PATENT DOCUMENTS

CN      112040092 A    12/2020
CN      112040092 B     5/2021

(Continued)

OTHER PUBLICATIONS

European Patent Office Communication issued in Application No. 23164067.3, dated Aug. 31, 2023.

(Continued)

*Primary Examiner* — Brian P Yenke
(74) *Attorney, Agent, or Firm* — Amster, Rothstein & Ebenstein LLP

(57) ABSTRACT

In a method of calibrating a background display and recording system comprising a background display device and a camera, at least one calibration representation is displayed by the background display device and an image of the at least one calibration representation is generated by the camera, based on which image at least one first transformation rule is determined that relates to the control of the background display device. Furthermore, at least one second transformation rule is determined that relates to a transformation of camera image data of the camera. The transformation rules are determined such that the representation of the virtual background can be captured by the camera as in natural light conditions in the virtual background and the real subject can be captured by the camera as in natural light conditions in the virtual image recording studio.

23 Claims, 4 Drawing Sheets

(56) References Cited

U.S. PATENT DOCUMENTS

Figure 1:
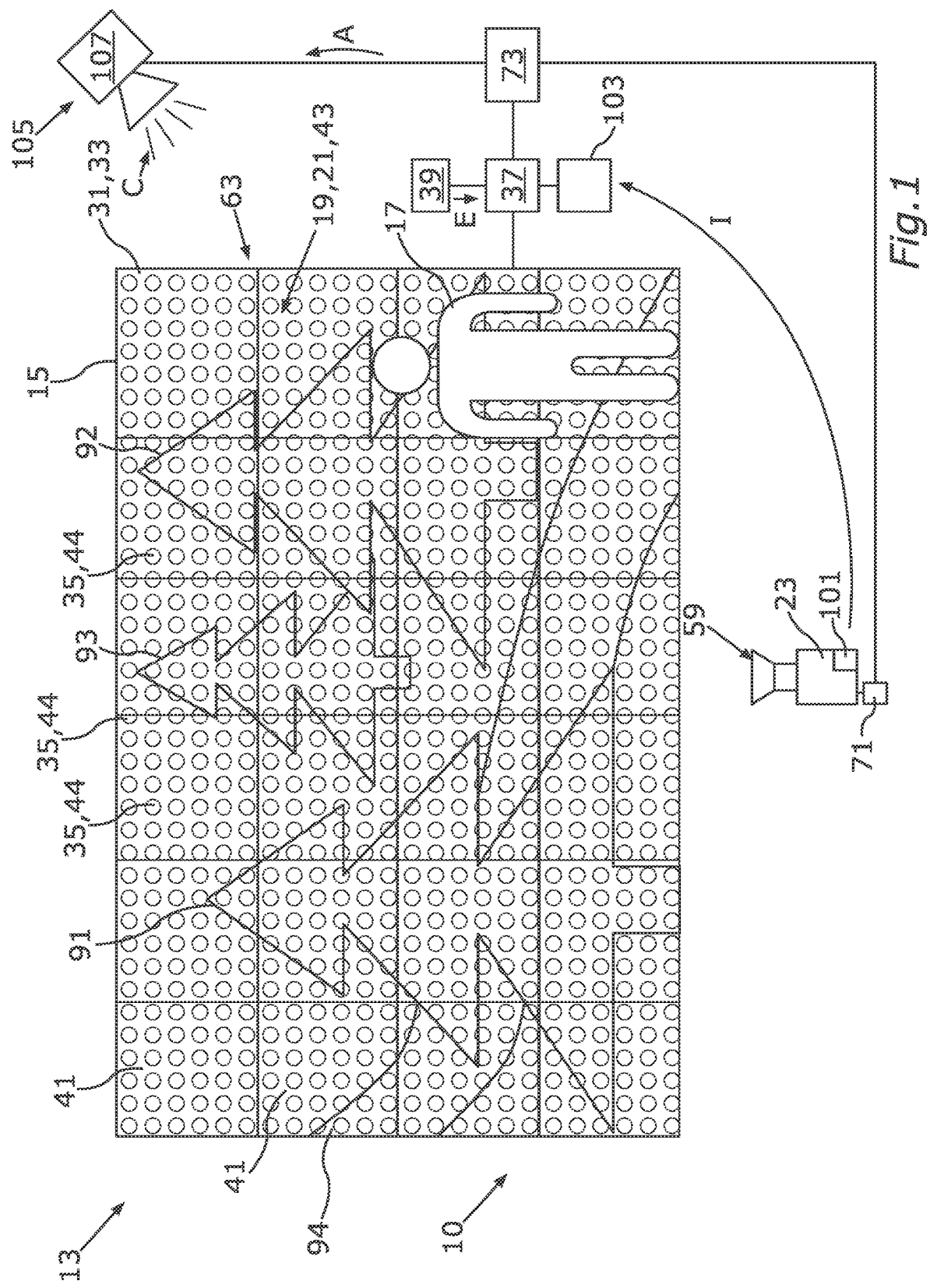

| | | | |
|---|---|---|---|
| 9,967,529 B2* | 5/2018 | Mitchell | H04N 9/3194 |
| 10,009,605 B1* | 6/2018 | Yin | H01L 27/14621 |
| 10,251,462 B2* | 4/2019 | Franke | A45D 44/005 |
| 10,317,778 B2* | 6/2019 | Ley | G03B 15/07 |
| 10,390,009 B1* | 8/2019 | Chen | G09G 5/10 |
| 11,100,894 B1* | 8/2021 | Huss | H04M 1/2473 |
| 11,107,195 B1* | 8/2021 | Cordes | G06T 7/90 |
| 11,496,691 B2* | 11/2022 | Chapman | H04N 23/90 |
| 11,530,981 B2* | 12/2022 | Kim | G01J 3/524 |
| 11,665,307 B2* | 5/2023 | Koppetz | G06T 5/00 396/3 |
| 11,924,560 B2* | 3/2024 | Thielemans | H04N 9/64 |
| 11,991,483 B2* | 5/2024 | Popp | G09G 3/32 |
| 12,019,239 B2* | 6/2024 | Schuck, III | G01J 3/465 |
| 12,022,243 B2* | 6/2024 | Popp | H04N 9/3155 |
| 12,075,182 B2* | 8/2024 | Ukas-Bradley | H04N 5/265 |
| 12,170,858 B2* | 12/2024 | Popp | H04N 5/2224 |
| 2002/0191109 A1* | 12/2002 | Kriegman | H04N 9/75 348/E5.058 |
| 2007/0146268 A1* | 6/2007 | Jeong | H04N 9/64 345/88 |
| 2007/0291047 A1 | 12/2007 | Harville et al. | |
| 2008/0170004 A1* | 7/2008 | Jung | G09G 3/3233 345/76 |
| 2014/0313302 A1 | 10/2014 | Franke et al. | |
| 2016/0063951 A1* | 3/2016 | Ikizyan | G09G 5/02 345/590 |
| 2018/0204524 A1* | 7/2018 | Kucera | G09G 3/30 |
| 2019/0052872 A1* | 2/2019 | Shyshkin | G09G 3/006 |
| 2019/0373206 A1* | 12/2019 | Kang | H04N 5/57 |
| 2020/0143592 A1* | 5/2020 | Cordes | H04N 23/90 |
| 2020/0145644 A1 | 5/2020 | Cordes et al. | |
| 2020/0388210 A1* | 12/2020 | Thielemans | G09G 5/12 |
| 2022/0086409 A1* | 3/2022 | Park | G01J 3/524 |
| 2022/0095428 A1 | 3/2022 | Edwards | |
| 2022/0207675 A1* | 6/2022 | Merrell | H04N 23/80 |
| 2023/0110191 A1* | 4/2023 | Popp | H04N 9/30 386/343 |
| 2023/0113256 A1* | 4/2023 | Popp | H04N 7/183 348/207.99 |
| 2023/0114419 A1* | 4/2023 | Popp | H04N 5/76 348/801 |
| 2023/0262188 A1* | 8/2023 | Koppetz | H04N 5/2224 396/3 |
| 2023/0328194 A1* | 10/2023 | Popp | H04N 5/262 348/370 |
| 2023/0421910 A1* | 12/2023 | Kiran Urs | H04N 23/73 |

FOREIGN PATENT DOCUMENTS

| | | |
|---|---|---|
| DE | 102020119601 A1 | 1/2022 |
| EP | 3972388 A1 | 3/2022 |
| WO | 2020097212 A1 | 5/2020 |

OTHER PUBLICATIONS

Anonymous: "In-Camera VFX Camera Color Calibration I Unreal Engine Documentation", Oct. 26, 2021, pp. 1-11, XP093074329, found in the internet: URL:https://web.archive.org/web/20211026141823/https://docs.unrealengine.com/4.27/en-US/WorkingWithMedia/IntegratingMedia/InCameraVFX/InCameraVFXCameraCalibration/ (found on Aug. 16, 2023).

Anonymous: "Color Fidelity in LED vols. 1-15- The American Society of Cinematographers (en-US)", Dec. 20, 2021, pp. 1-14, XP093074339, found in the internet: URL:https://theasc.com/articles/color-fidelity-in-led-volumes (found on Aug. 16, 2023).

German Patent and Trademark Office Communication issued in Application No. 10 2022 108 578.3, dated Jan. 26, 2023.

* cited by examiner

METHOD OF CALIBRATING A BACKGROUND DISPLAY AND RECORDING SYSTEM

The invention relates to a method of calibrating a background display and recording system comprising a background display device and a camera. The background display device of the background display and recording system is configured to display, behind or above a real subject, a representation of a virtual background for a recording in a virtual image recording studio and has a plurality of light sources that generate light in a plurality of different emission spectra. The camera is configured to image the representation of the virtual background and the real subject during a recording, wherein the camera has an image sensor having a plurality of light-sensitive sensor elements to convert incident light in accordance with a plurality of different sensitivity spectra into image signals.

In such a background display and recording system, a representation of a virtual background may be displayed by means of the background display device so that this representation of the virtual background may be directly imaged by the camera during a recording in the virtual image recording studio. As a result, a representation of a landscape or a space may, for example, be displayed in the virtual image recording studio to immediately record a scene that takes place in the represented landscape or in the represented space. In contrast to, for instance, a green screen recording, the virtual background may thus already be visibly displayed during the recording and may be directly imaged by the camera without having to be added afterwards.

For example, by means of such a background display and recording system, a moving image sequence, for instance for a movie, may be recorded in a virtual image recording studio while a representation of the provided background is displayed by means of the background display device. In this respect, movements in the virtual background may generally also be displayable by appropriately controlling the light sources so that an actor may directly react to events taking place in the background and may adapt the acting accordingly.

Furthermore, such background display devices may also be used when taking still images or photographs in a virtual image recording studio, wherein in particular the interaction between persons or objects located in the foreground and the virtual background—again in contrast to a green screen recording—is immediately recognizable and may be directly checked in the images of the camera. Such background display and recording systems thus make it possible to perform recordings in virtual image recording studios, but in so doing allow the impression to arise that the recording is taking place in a real environment corresponding to the virtual background.

However, there is a problem with such background display and recording systems that by generating the representation of the virtual background by means of a plurality of light sources having respective characteristic emission spectra, the representation of the virtual background is displayed with an artificial emission spectrum. This artificial emission spectrum differs from a light spectrum with which a real background corresponding to the virtual background would reflect natural light and would therefore be perceived. The control of the light sources may indeed take place such that a human viewer perceives the representation of the virtual background in natural colors, i.e. based on the spectral sensitivity of the human eye. However, in an image of the representation of the virtual background generated by the camera, deviations may occur between the spectrum actually emitted by the light sources and the spectrum that is registered and imaged by the camera due to the superposition of the emission spectra of the light sources and the sensitivity spectra of the light-sensitive sensor elements of the camera that differ therefrom. However, this shift may lead to an unnatural impression of the image, in particular an unnatural color impression.

Furthermore, due to the emission spectrum of the background display device differing from natural light, the real subjects that are illuminated by the background display device during a recording and that reflect the light emitted by the background display device may also appear different in the image generated by the camera than would be expected on an illumination by natural light. Recordings by means of such a background display and recording system may therefore possibly give an undesirably unnatural impression.

It is therefore an object of the invention to provide a possibility of achieving natural-looking images of the representation of the virtual background and of the real subject in a background display and recording system of the aforementioned kind.

This object is satisfied by a method of calibrating a background display and recording system comprising the features of claim 1.

The method comprises the following steps:
- displaying at least one calibration representation by the background display device and generating an image of the at least one calibration representation by the camera;
- determining at least one first transformation rule based on the image of the calibration representation, wherein the at least one first transformation rule relates to the control of the background display device;
- determining at least one second transformation rule, wherein the at least one second transformation rule relates to a transformation of camera image data of the camera, wherein the at least one first transformation rule and the at least one second transformation rule are determined such that the representation of the virtual background may be captured by the camera as in natural light conditions in the virtual background and such that the real subject may be captured by the camera as in natural light conditions in the virtual image recording studio.

In the method, a calibration representation is thus displayed at the background display device and imaged by the camera in order to determine, based on the image of the calibration representation, at least one first transformation rule that relates to the control of the background display device. Thus, the first transformation rule may in particular be adapted to be applied to input image data of the background display device during a subsequent recording in the virtual image recording studio in order to transform the input image data. The calibration representation may in particular be displayed by appropriately controlling the light sources and may be displayed specifically to determine the at least one first transformation rule. The calibration representation may therefore in particular not form a representation of a virtual background that is intended for a recording in the virtual image recording studio, wherein it is generally, however, also possible to determine the first transformation rule based on a calibration representation that is also suitable as a representation of a virtual background.

For example, the background display device may comprise a control device and an image generator or may be connected to an image generator that generates the input image data that are to represent the representation of the virtual background during a recording. Such an image generator may, for example, be configured as a game engine or comprise a game engine that may form a software module by means of which the representation of the virtual background may be generated. A game engine may in particular be configured to generate or to adapt the representation of the virtual background in dependence on a position of the camera in order to generate the representation of the virtual background in dependence on the position of the player—similarly to in computer games. For this purpose, the game engine may, for example, access one or more databases in which models, in particular three-dimensional models, of the virtual background may be stored. However, provision may also be made that the input image data are, for example, received as a video or photo file and are displayed at the background display device.

To display the input image data at the background display device, the background display device may further in particular comprise a control unit that may also be referred to as a display controller. This control unit may be configured to convert the input image data in accordance with a display transformation rule and/or into a standard color space to be able to display the representation of the virtual background represented by the input image data by means of the light sources.

As already explained, the input image data may be transformable into a standard color space such that the displayed representation of the virtual background looks to the human viewer like a real background corresponding to the virtual background, for which purpose a transformation to the REC 709 video standard may be provided, for example. However, the representation of the virtual background may be captured differently by the camera than it is actually displayed due to the sensitivity spectra of the light-sensitive sensor elements of the camera only partly matching the emission spectra of the background display device. Thus, the light-sensitive sensor elements, which may also be referred to as pixels of the image sensor, may, for example, be provided with respective color filters that determine the spectral sensitivity of the sensor elements. Due to such filters, which may, for example, be arranged in accordance with a so-called Bayer pattern known from the patent document U.S. Pat. No. 3,971,065 A, respective narrow-band sensitivity spectra may in particular be defined for the sensor elements so that a single sensor element may be sensitive to a narrow-band wavelength range and a predetermined color. For example, three, four, or five different sensitivity spectra of this kind may be implemented in the image sensor that in particular only overlap in respective spectral marginal regions. In this respect, the filters may in particular be selected and distributed such that a sensitivity spectrum of the image sensor that overall reproduces the natural light spectrum results due the superposition of the individual sensitivity spectra of the sensor elements.

The camera may furthermore comprise a control unit that is configured to transform image data generated by the camera in accordance with a camera transformation rule, wherein this camera transformation rule may in particular be predetermined. Such a camera transformation rule may start from a recording under natural light conditions due to white light. The camera transformation rule may therefore be adapted to transform the image data generated by the camera assuming a spectral distribution of the environmental light that is continuous over the visible wavelength range and—in contrast to a plurality of nearly disjoint emission spectra—may in particular be substantially uniformly distributed.

Since the background display device, however, displays the representation of the virtual background with an emission spectrum deviating from natural light conditions (in particular with pronounced maxima and minima or even gaps), spectral shifts with respect to the emission spectrum of the background display device may occur in the generated image that is determined by the sensitivity spectra of the sensor elements and/or the camera transformation rule. The spectral shifts may in particular appear as color shifts that may lead to an unnatural impression of the image.

Due to the first transformation rule, the input image data may, in contrast, be adapted such that the representation of the virtual background may be captured by the camera as in natural light conditions in the virtual background, i.e. the image of the representation of the virtual background generated by the camera appears like an image of a real background which corresponds to the virtual background and in which natural light conditions prevail. By applying the first transformation rule, the input image data that represent the representation of the virtual background may be transformed and the representation may thus be displayed changed at the background display device. This may indeed result in the displayed representation appearing unnatural to the human viewer, whereas it may, however, be achieved that the representation of the virtual background in the image appears natural.

In connection with the invention, natural light conditions are to be understood as the illumination with diffuse white environmental light, as it, for example, prevails as daylight under cloudy skies at midday.

To determine the (at least one) first transformation rule, a calibration representation, in particular a representation with defined colors or with a defined color, is displayed at the background display device and imaged by means of the camera. Thereupon, it may be checked whether the image of the calibration representation matches the calibration representation represented by corresponding input image data, wherein it may in particular be checked whether the color of the calibration representation in the image matches the color of the displayed calibration representation. If a deviation is determined in such a comparison, the first transformation rule may be determined such that, after the first transformation rule has been applied to the input image data, the color defined by the input image data actually appears in the image generated by the camera.

The background display device may in particular have different light sources that are configured to emit light with different spectra or in different colors so that the display of a respective color may be achieved by mixing these spectra. To determine the first transformation rule, a plurality of calibration representations may in particular also be displayed by activating the light sources of a respective color and deactivating the other light sources in order to generate a respective calibration representation. However, by mixing the different light sources, provision may also be made to display a specific but previously defined color as a calibration representation that may then be imaged by means of the camera in order to compare the imaged color with the color actually displayed. This may in particular also make it possible to determine wavelength-dependent or color-dependent first transformation rules.

By determining the (at least one) first transformation rule based on the image of the calibration representation generated by the camera, the background display device may in particular be directly and specifically matched to the camera also provided for the subsequent recording in the virtual image recording studio. Thus, a camera-intrinsic and in this regard a camera-specific color correction may in particular be utilized in the calibration of the background display device by using the camera as a measurement device with respect to the light emitted by the background display device and in particular by basing the calibration on the specific sensitivity spectra of the light-sensitive sensor elements and/or the camera transformation rule already mentioned. This may in particular enable an automatic calibration of the background display device and/or of the camera without all the components and in particular the camera first having to be manually characterized. Rather, exact knowledge of the emission spectra of the light sources of the background display device, of the sensitivity spectra of the camera, and/or of the camera transformation rule is not necessarily required to be able to perform the calibration and to determine the (at least one) first transformation rule.

In addition to the (at least one) first transformation rule, at least one second transformation rule is further determined that relates to a transformation of camera image data of the camera, i.e. that is adapted to be applied to the camera image data. By applying the second transformation rule, the camera image data that represent the image generated by the camera may thus also be adapted to approximate the image generated by the camera to an image under natural light conditions. The second transformation rule may therefore be adapted to be applied to camera image data in order to transform the camera image data.

Said image generated by the camera may ultimately be present in the form of an image data set that comprises the camera image data. The camera image data correspond to the image signals generated by the image sensor and may, for example, include respective color values of individual sensor elements or pixels. Such an image data set may be generated as a still image data set or a moving image data set to represent a still image recording or a recording of a moving image sequence or the image information included therein (including respective color values).

Since the second transformation rule may be applied to the camera image data, the camera transformation rule already mentioned may be adapted. It may hereby be taken into account that a recording takes place in the virtual image recording studio and that deviations of the light emitted by the background display device (in particular its spectral distribution) from natural light occur there. Thus, with respect to the environmental light generated by the background display device, a camera-side correction (i.e. a correction applied to the camera image data) is made possible. As a result, changed reflections of real subjects, which are illuminated by the background display device, in comparison with an illumination by natural light may in particular be compensated in the camera image data so that these real subjects appear in the image generated by the camera as in a recording under natural light conditions. While both the camera transformation rule and the at least one second transformation rule may generally be performed by a control unit integrated into the camera, it is also possible for the camera transformation rule and/or the second transformation rule to only be applied downstream during post-production. In this regard, the camera image data from the camera may generally also be transmitted unchanged to an external control unit that is configured to transform the camera image data in accordance with the second transformation rule.

The (at least one) first transformation rule may thus in particular relate to the representation of the virtual background that may be adapted by applying the first transformation rule such that the image of said representation by the camera appears like an image of a real background corresponding to the virtual background under natural light conditions. In contrast, the (at least one) second transformation rule may in particular be directed at adapting the camera image data such that imaged reflections of the light emitted by the background display device are adapted by real subjects such that they are approximated to the image of a reflection of natural light. Thus, by applying the first transformation rule and the second transformation rule, the representation of the virtual background may be captured by the camera as if natural light conditions were to prevail in the virtual background and, at the same time, the real subject may be captured by the camera as if natural light conditions were to prevail in the virtual image recording studio.

In this respect, in some embodiments, the respective transformation rules may, for example, be applied to respective image regions in the image generated by the camera, as explained in more detail below. However, in some embodiments, it is also possible for the first transformation rule and the second transformation rule to be matched to one another such that, when applying the first transformation rule to the total representation of the virtual background and when applying the second transformation rule to the total camera image data, the scene recorded in the virtual image recording studio may be captured by the camera as under natural light conditions. Such a mutual matching may, for example, also take place iteratively to account for the fact that an application of the first transformation rule may influence the result of an application of the second transformation rule, and vice versa. This is also explained in more detail below.

Thus, a matching between the camera and the background display device may be performed by the calibration method so that natural light conditions are reproduced in a subsequent recording both for the representation of the virtual background and for the real subject in the virtual image recording studio—in each case related to the acquisition by the camera. This matching may in particular take place specifically for the camera used or for the spectral properties of the image sensor since the superposition of the emission spectra of the background display device and the sensitivity spectra of the light-sensitive sensor elements of the camera may also ultimately be determined by the camera. Thus, provision may be made to perform the calibration method prior to a recording in the virtual image recording studio in order to match the background display device and the camera to one another. If different cameras are used during a recording, in particular one after another, the background display and recording system may be calibrated separately for each of the cameras. In this respect, the respective transformation rules for a camera type or a camera may, however, possibly be stored in a memory to be able to directly use the transformation rules during subsequent recordings.

Further embodiments can be seen from the dependent claims, the description, and the Figures.

The first transformation rule and the second transformation rule may be directed to a respective color transformation in some embodiments. This is explained in more detail below.

In some embodiments, the at least one first transformation rule may relate to a color transformation of colors displayed by means of the background display device. As already explained, input image data that are received and/or generated by the background display device and that represent the representation of the virtual background may in particular be adapted by means of the first transformation rule such that the representation in the image generated by the camera appears natural. For example, if it is determined by the imaging of the calibration representation that a shift to longer wavelengths takes place in the image at a specific color due to the superposition of the emission spectra of the light sources and the sensitivity spectra of the light-sensitive sensor elements of the camera, the at least one first transformation rule may be determined such that this color is intentionally displayed shifted to shorter wavelengths at the background display device to ultimately produce the desired color in the image. By applying the at least one first transformation rule, the representation of the virtual background may thus be displayed changed such that the intended colors only become visible in the image of the camera.

Such a color transformation may, for example, take place by individually shifting respective RGB (red-green-blue) values that define a specific color to be displayed at the background display device so that the respective color may be defined by a changed mixture of red, green, and blue light. This may in particular be provided in embodiments in which the light sources of the background display device are arranged in groups of light sources, wherein each of the groups has a respective light source emitting red light, a respective light source emitting green light, and a respective light source emitting blue light and a color mixer to be able to define the color of the light emitted by the group of light sources by an appropriate setting of the intensities of the individual light sources. In this regard, the first transformation rule may in particular describe an adaptation or a change of the respective intensities of the light sources that are associated with a specific color to be displayed at the background display device.

In some embodiments, the calibration representation may be unicolored or multicolored. In a unicolored calibration representation, a predefined color may in particular be displayed to compare how this color is imaged by means of the associated camera. The at least one first transformation rule may then be determined based on a possible deviation. In multicolor calibration representations, defined colors may in particular be assigned to different regions of the calibration representation so that the corresponding regions in the image may be compared with the displayed representation.

For determining the at least one first transformation rule, a first calibration representation, a second calibration representation, a third calibration representation, and a fourth calibration representation may be displayed and imaged in some embodiments, wherein the colors of the calibration representations may differ from one another. The at least one first transformation rule may then be determined based on the images of the calibration representations. The respective calibration representations may in particular be unicolored, wherein the colors of the calibration representations may differ from one another. In general, more than four calibration representations may also be displayed and imaged in order to determine the at least one first transformation rule.

In some embodiments, the first calibration representation may be red, the second calibration representation may be green, the third calibration representation may be blue, and the fourth calibration representation may be white. The background display device may in particular comprise a plurality of light-emitting diodes as light sources, wherein these light-emitting diodes may again be divided into groups of light-emitting diodes. The respective groups of light-emitting diodes may differ from one another by their emission spectra, wherein, for example, a group of light-emitting diodes may emit red light, a group of light-emitting diodes may emit green light, and a group of light-emitting diodes may emit blue light. By appropriately controlling the light-emitting diodes, different colors may finally be mixed and the representation of the virtual background may thereby be generated.

To determine the first transformation rule, all the light-emitting diodes emitting red light may, for example, be activated while the other light-emitting diodes are deactivated in order to generate a first calibration representation. A second calibration representation may be generated by activated light-emitting diodes emitting green light and a third calibration representation may be generated by activated light-emitting diodes emitting blue light. Based on these calibration representations, the first transformation rule may then be determined, in particular also in dependence on wavelength, by comparing the colors defined by the emission spectra of the light-emitting diodes with the colors captured or imaged by the camera. In order furthermore to check how light emitted by the background display device that replicates natural white light is imaged by the camera, a white calibration representation may be generated and imaged by appropriately controlling the light sources or light-emitting diodes. This image may also be used to determine the at least one first transformation rule.

In some embodiments, for determining the at least one first transformation rule, color values in the image of the calibration representation may be compared with color values of the displayed calibration representation. It may therefore in particular be checked whether a color value set at the background display device or represented by input image data is correspondingly imaged by the camera.

In some embodiments, the first transformation rule may be checked by displaying a calibration representation while applying the first transformation rule. In such embodiments, the first transformation rule may thus be determined, wherein the same input image data may then be displayed again, but while applying the determined first transformation rule at the background display device. This calibration representation that is so-to-say transformed may be imaged by means of the camera, wherein it may be checked in the image of the camera whether the calibration representation corresponding to the input image data—i.e. the calibration representation without application of the first transformation rule—may now be captured by means of the camera. If, despite the application of the at least one first transformation rule to the input image data, there are still deviations between the image and the calibration representation defined by the input image data, the first transformation rule may be adapted and, if necessary, a further check may take place while applying this adapted first transformation rule.

In some embodiments, information about the at least one calibration representation may be transmitted from the camera to the background display device and the calibration representation may be displayed in dependence on the transmitted information.

In such embodiments, the camera may be configured to request the display of a calibration representation at the background display device to then be able to compare its image with the requested calibration representation. For example, the camera may be configured to transmit the input image data to the background display device that represent the calibration representation. Alternatively thereto, the camera may, however, also transmit a specific color value to the background display device to cause the latter to display a calibration representation with the respective color value. The requested calibration representation may then be imaged by the camera and the at least one first transformation rule may be determined. If necessary, the camera may request the display of the calibration representation or of a specific color value again, wherein, in this step, the already determined first transformation rule may be applied to the input image data to check whether the imaged calibration representation corresponds to the requested calibration representation when applying the at least one first transformation rule. Accordingly, the at least one first transformation rule may in particular be determined by a control unit and/or an image evaluation unit of the camera and may be transmitted to a control unit of the background display device.

In some embodiments, the at least one second transformation rule may relate to a color transformation of the camera image data. Camera image data that represent the imaged real subject may in particular be adapted by means of the at least one second transformation rule such that reflections deviating from an illumination by natural light due to the illumination by the background display device and color shifts associated therewith may be compensated. However, provision may also be made to transform all the camera image data, i.e. also camera image data that relate to the representation of the virtual background, by the at least one second transformation rule.

To perform such a color transformation, provision may in particular be made to shift respective values of the camera image data in an RGB (red-green-blue) color space into one another, for which purpose the second transformation rule may in particular comprise a 3×3 matrix or be defined by a 3×3 matrix. The second transformation rule may further in particular comprise one or more 3×3 matrix transformations to be able to achieve a corresponding color shift in the camera image data.

The at least one second transformation rule may be calculated and/or looked up in a look-up table in some embodiments. The at least one second transformation rule may in particular be calculated and/or looked up in dependence on the at least one first transformation rule.

The emission spectra of the light sources of the background display device may generally be known so that the emission spectrum of the background display device may also be known or determinable after applying the at least one first transformation rule. The spectra of reflections by real subjects that are positioned in front of or below the background display device and illuminated by it may hereby, for example, also be calculated or looked up. This makes it possible to directly determine a second transformation rule based on the known emission spectra of the light sources and the at least one first transformation rule in order to transform the camera image data such that in particular the real subject imaged during a subsequent recording appears as in a recording under natural light conditions in the virtual image recording studio.

In some embodiments, the determination of the at least one second transformation rule may comprise the following steps:
  illuminating a real calibration object by the background display device and generating an image of the illuminated calibration object using the camera; and
  determining the at least one second transformation rule based on the image of the calibration object.

Since a real calibration object may be illuminated by the background display device and may thereupon be imaged by the camera, the imaged calibration object may be compared with the calibration object itself in order to determine the at least one second transformation rule based on this comparison. In particular, real colors of the calibration object, which may be defined by the reflection of natural light by the calibration object, may be compared with the colors of the calibration object in the image generated by the camera. If deviations are found during such a comparison, the at least one second transformation rule may be determined such that these deviations are compensated by applying the at least one second transformation rule to the camera image data that represent the image of the calibration object. For this purpose, the color of the calibration object may in particular be known or predefined so that a color value in the image of the calibration object may be compared with the expected color value.

In some embodiments, for determining the at least one second transformation rule, at least one color of the calibration object in the image is compared with the color of the real calibration object. For this purpose, the calibration object may be unicolored or multicolored, wherein, in the case of a multicolored design of the calibration object, in particular different regions in the image may be compared with the corresponding regions of the calibration object.

In some embodiments, the at least one second transformation rule may be determined such that the color in the image is approximated to the real color. For this purpose, respective color values of the real calibration object and the imaged calibration object may in particular be compared with one another to be able to accordingly adapt the camera image data generated by the camera by means of the second transformation rule.

In some embodiments, the calibration object may be a color chart on which a plurality of defined colors are displayed, wherein, for determining the at least one second transformation rule, the colors in the image are compared with the colors on the color chart.

In particular by imaging such a color chart, but also generally by imaging the calibration object, a color rendering index may be determined. For example, the fourteen test colors defined in accordance with DIN 6169, or at least the first eight test colors according to DIN 6169 that are conventionally used to calculate the color rendering index, may be displayed on a color chart for this purpose. In this respect, the at least one second transformation rule may, for example, be determined such that as high as possible a color rendering index or a color rendering index as close as possible to 100 is achieved. Furthermore, the second transformation rule may be determined as that transformation rule in which the color rendering index is optimized. Alternatively or in addition to a consideration of the color rendering index, one or more color distances, which may also be referred to as delta E ($\Delta E$), between colors of the calibration object and the colors in the image generated by the camera may also be determined to determine the at least one second transformation rule such that the color distance or the color distances are minimized.

To determine or to define the at least one second transformation rule, provision may, for example, be made to determine one or more color distances and, for example, to output them at a display of a control device so that a user may decide whether the color distance achieved or the color distances achieved are acceptable or whether the second transformation rule has to be adapted. In such a procedure, the second transformation rule may thus in particular be adapted until the user deems the determined color distances to be appropriate. However, as an alternative to a check by the user, a fully automated determination of the second transformation rule may, however, also be provided by applying a randomized algorithm or artificial intelligence, in particular a machine learning algorithm, to minimize color distances or to optimize the color rendering index. For example, for this purpose, a determined color distance may be predefined or may be predefinable by a user and the second transformation rule may be determined as such a transformation rule in which the determined color distance falls below the determined color distance, whereas a further transformation rule in which an illumination of the calibration object may be applied and checked may otherwise be suggested by the algorithm. Also in the case of a check by a user, the transformation rules to be checked may be determined in a randomized manner and/or by applying artificial intelligence.

In some embodiments, the background display device may be controlled to illuminate the calibration object while applying the at least one first transformation rule. In such embodiments, the at least one first transformation rule may consequently first be determined in order to then illuminate the calibration object, for example, with light that replicates white and natural light, wherein this white light may, however, already be adapted in accordance with the first transformation rule. Consequently, in such embodiments, the at least one second transformation rule may already be determined under conditions that are provided during an actual recording in the virtual image recording studio in which the at least one first transformation rule is applied to the input image data. It may thereby be checked which reflections of the light generated by the background display device by the real subjects are to be expected during a recording.

In some embodiments, the at least one first transformation rule and the at least one second transformation rule may be matched to one another such that both the representation of the virtual background and the real subject are imaged by the camera as under natural light conditions when the at least one first transformation rule and the at least one second transformation rule are applied. Due to such a matching of the first transformation rule and the second transformation rule to one another, it may thus be achieved that when applying the at least one first transformation rule to all the input image data that represent the representation of the virtual background and when applying the at least one second transformation rule to all the camera image data that represent the image of the representation of the virtual background and of the real subject, an image is achieved that appears like an image under natural light conditions.

In some embodiments, the at least one first transformation rule and the at least one second transformation rule may be matched to one another by generating images while applying the first transformation rule and the second transformation rule and by iteratively adapting the first transformation rule and/or the second transformation rule. In such embodiments, the first transformation rule may, for example, first be determined in that at least one calibration representation is displayed at the background display device and is imaged by the camera. Thereupon, a calibration object may, for example while applying the determined first transformation rule, be illuminated by the background display device and imaged by the camera to determine the at least one second transformation rule that is applied to camera image data generated by the camera. This may in particular be aimed at adapting the camera image data such that the calibration object appears in the image as if it had been imaged under natural light conditions.

The calibration representation may subsequently be displayed again, wherein the first transformation rule may be applied to the input image data that represent the calibration representation and the camera image data may be transformed by means of the second transformation rule. The image obtained while applying both transformation rules may be compared with the calibration representation represented by the input image data—i.e. the calibration representation to which the first transformation rule was not applied—in order to check whether the imaged calibration representation corresponds to the expected calibration representation despite the application of both transformation rules and in particular also of the second transformation rule. If deviations are found in this respect, the first transformation rule and/or the second transformation rule may be adapted. After adapting the first transformation rule, the calibration object may, for example, be illuminated and imaged again while applying the adapted first transformation rule, wherein the previously determined second transformation rule may be applied to the camera image data. It may then be checked whether the calibration object has been imaged in the intended manner in order to perform an adaptation of the first transformation rule and/or the second transformation rule, if necessary. This process may be performed iteratively until satisfactorily matched transformation rules have been determined that may be applied to the total input image data and the total camera image data.

In some embodiments, a plurality of first transformation rules and a plurality of second transformation rules may be determined, wherein a pair of a first transformation rule and a second transformation rule may be selected from the plurality of first transformation rules and the plurality of second transformation rules such that, when applying the first transformation rule and the second transformation rule, both the representation of the virtual background and the real subject are imaged by the camera as under natural light conditions. The selection may, as explained above, take place iteratively or a plurality of potentially suitable first and second transformation rules may be determined and, from these, the pair may be selected that achieves the most natural image when applied. This may possibly take place by testing different pairs.

However, as an alternative to such a matching, provision may, however, also be made that the two transformation rules are determined separately. This may, for example, be provided when the second transformation rule is only applied to those camera image data that represent the real subject. In such embodiments, it may be achieved by means of the first transformation rule that the representation of the virtual background is imaged like a real background corresponding to the virtual background with natural light conditions, wherein, by the intentional application of the at least one second transformation rule to camera image data that represent the real subject, said real subject may be imaged as if it were illuminated by natural light in the virtual image recording studio. Nevertheless, even with such a separate application of the second transformation rule, provision may be made to control the background display device to determine the second transformation rule while applying the first transformation rule.

In some embodiments, the background display device may be configured as an LED wall and the plurality of light sources may have a plurality of actively illuminating light-emitting diodes or light-emitting diode units. The light sources may in particular be configured as respective light-emitting diodes that may be individually controllable and may be configured to display light with a respective emission spectrum. These emission spectra may in particular differ so that different colors may be generated by appropriately controlling and mixing the light-emitting diodes. However, it may also be predefined that the light sources are configured as light-emitting diode units that comprise a plurality of light-emitting diodes of different colors and a color mixer to be able to set the emission of a specific spectrum or of a specific color at the light-emitting diode unit by appropriately controlling the light-emitting diodes of a light-emitting diode unit.

In some embodiments, the background display device may extend in a vertical and/or horizontal orientation. The background display device may in particular extend vertically behind a real subject, for example an actor, and/or horizontally above such a subject in order, for example, to be able to display a ceiling or a sky above the real subject.

The background display device may be configured to display the representation of the virtual background over a width of at least 5 m and a height of at least 2 m. Furthermore, in some embodiments, the background display device may be at least sectionally curved and/or arched. For example, the background display device may extend in a vertical orientation behind a real subject to transition to a horizontal orientation through a curved section and to extend in a horizontal orientation above the real subject.

In some embodiments, a setting instruction for an associated illumination apparatus, in particular a spotlight, which is configured to generate an illumination light with an adaptable emission spectrum, may be determined in dependence on the at least one first transformation instruction and/or in dependence on the at least one second transformation instruction.

For example, such an illumination apparatus may be provided as studio lighting to illuminate the real subject during a recording in the virtual image recording studio. For this purpose, one or more spotlights may in particular be used that may be configured to generate illumination light with different emission spectra or in different colors.

To achieve a natural illumination and correspondingly natural-looking images, the illumination apparatus may in particular be configured to emit an emission spectrum that replicates natural light and that has as high as possible a color rendering index. Whereas, with a camera and/or a camera transformation rule adapted for a recording under natural light conditions, such an illumination may generally lead to desired images in which in particular also the light reflected by the real subject is imaged in the desired color, in particular the application of the second transformation rule to the camera image data may lead to the light emitted by the spotlight and reflected by the real subject being imaged with a color shift.

However, this problem may be addressed in that a setting instruction that considers the first transformation instruction and/or the second transformation instruction is determined for the illumination apparatus during or as a result of the calibration of the background display and recording system. For example, a setting instruction may be determined such that the emission spectrum emitted by the illumination apparatus is approximated to the emission spectrum which the background display device emits during a display of white light so that, during the recording, the illumination apparatus may also generate an emission spectrum to which the camera is matched. The setting instruction may thus in particular relate to the emission spectrum generated by the illumination apparatus.

The setting instruction may in particular be determined by considering known emission spectra of the illumination apparatus so that a measurement or an image of a real subject illuminated by the illumination apparatus does not necessarily have to take place by the camera. Rather, the setting instruction may, for example, be calculated and/or looked up in a look-up table in dependence on the first transformation instruction and/or the second transformation instruction. Thus, for example based on the first transformation instruction, it may be determined with which emission spectrum white light is generated at the background display device in order to replicate this emission spectrum by a corresponding setting instruction at the illumination apparatus. Furthermore, a color shift of the camera image data may in particular be determined by the second transformation rule so that the second transformation rule may directly define how or with what color light reflected from the real subject is imaged. The setting instruction may thus, for example, be determined based on the second transformation rule such that the color shift of the light reflected by the real subject that is caused by the second transformation rule leads to a natural color impression in the image even on an illumination by the illumination apparatus. However, provision may also be made to illuminate a calibration object using the illumination apparatus after determining the first transformation rule and the second transformation rule and to image said calibration object using the camera in order to determine a setting instruction for the illumination apparatus in which the imaged calibration object is again imaged with the intended colors.

The determined setting instruction may in particular be stored to be able to be used in a subsequent recording in the virtual image recording studio. The setting instruction may therefore be output to a memory in some embodiments. Furthermore, provision may be made to output the setting instruction directly to the illumination apparatus in order to perform a corresponding control or to be able to perform it during a subsequent recording in the virtual image recording studio.

The invention further relates to a method of recording a representation of a virtual background and a real subject in a virtual image recording studio by a background display and recording system, in which the representation of the virtual background is displayed behind and/or above the real subject by a background display device and the representation of the virtual background and the real subject are imaged by a camera, wherein the background display and recording system is calibrated in accordance with a method of the kind disclosed herein. Furthermore, the first transformation rule and the second transformation rule are applied when recording the representation of the virtual background and the real subject.

As already explained, by applying the first transformation rule and the second transformation rule, a scene recorded in the virtual image recording studio may be imaged by means of the camera as if the recording took place under natural light conditions. The representation of the virtual background may thus be imaged as if a real background which corresponds to the virtual background and in which natural light conditions prevail were imaged. The real subject may also be imaged as in a recording in the real background or a recording under natural light conditions.

In general, the camera image data may be transformed by applying the at least one second transformation rule directly in the camera or the application of the second transformation rule may take place by a device external with respect to the camera, in particular during post-production. Thus, the application of the second transformation rule during the recording does not necessarily require the second transformation rule to be applied directly in time during the recording. However, provision may be made that the camera image data are processed directly in the camera by applying the second transformation rule so that image data output by the camera may already have been transformed by means of the second transformation rule.

In the method of recording a representation of a virtual background, provision may be made in some embodiments that the calibration method explained above is first performed in the virtual image recording studio in order to then start with the recording. However, provision may also be made that the calibration method has already been performed beforehand and an already calibrated background display and recording system is provided in the virtual image recording studio so that the explained method of recording a representation of a virtual background may be started immediately.

In some embodiments, input image data to be displayed at the background display device may be transformed and displayed using the first transformation rule. The input image data may thus be displayed changed at the background display device so that the representation of the virtual background represented by the input image data may first appear in the image generated by the camera.

In some embodiments, the at least one second transformation rule may be applied to all the image data generated by the camera. This may in particular be provided if the at least one first transformation rule and the at least one second transformation rule have been matched to one another.

Alternatively thereto, in some embodiments, provision may, however, also be made that the second transformation rule is only applied to camera image data that represent the real subject. In such embodiments, the first transformation rule may consequently be applied to image the representation of the virtual background such that it appears like an image of a real background under natural light conditions, whereas the second transformation rule may be specifically applied to image the real subject as if it were illuminated by natural light during the recording.

In some embodiments, metadata may be generated that associate a respective picture element (i.e. image element) in an image generated by the camera with the representation of the virtual background or with the real subject. In such embodiments, it may in particular be decided based on the metadata whether or not the second transformation rule is applied to a respective picture element in order to apply the second transformation rule only to camera image data that represent the real subject.

In embodiments in which the second transformation rule is only applied to camera image data that represent the real subject, the second transformation rule may generally be applied to all the camera image data that do not represent the representation of the virtual background. The second transformation rule may thus be applied to all the imaged foreground objects in such embodiments.

In some embodiments, the representation of the virtual background may be varied in time during the recording. Movements in the virtual background may in particular be displayed during a recording.

The representation of the virtual background may further represent a three-dimensional scene in some embodiments. This three-dimensional scene may in particular be projected onto the background display device and, for example, a two-dimensional LED wall.

In some embodiments, an illumination apparatus, in particular a spotlight, that is arranged in the virtual image recording studio and that is configured to generate an illumination light with an adaptable emission spectrum may be set in dependence on the at least one first transformation rule and/or in dependence on the at least one second transformation rule. The emission spectrum of the illumination apparatus and/or a color of the light emitted by the illumination apparatus may in particular be set in dependence on the at least one first transformation rule and/or in dependence on the at least one second transformation rule. For example, the illumination apparatus may be set such that its emission spectrum is approximated to the emission spectrum of a white light emitted by the background display device while applying the first transformation rule so that the camera matched to this emission spectrum of the background display device may also image light emitted by the illumination apparatus and reflected by the real subject as expected. For this purpose, in particular a setting instruction for the illumination apparatus determined in the course of the calibration of the background display and recording system may be implemented during the recording.

The invention further relates to a background display and recording system for a virtual image recording studio that comprises a background display device and a camera. The background display device is configured to display, behind or above a real subject, a representation of a virtual background for a recording in the virtual image recording studio and the camera is configured to image the representation of the virtual background and the real subject. The background display and recording system further has a control device that is configured to perform the calibration method of the kind described herein.

The control device of the background display and recording system may in particular have respective components in the camera and in or at the background display device. For example, the control device may comprise an image evaluation device that is arranged in the camera and that is configured to compare the image of the calibration representation with the displayed calibration representation in order to determine the at least one first transformation rule. Furthermore, such an image evaluation device may be configured to also determine the at least one second transformation rule based on an image of a real calibration object. A control unit of the background display device may in particular be configured to display the calibration representation in dependence on received or generated input image data and/or to apply the first transformation rule to the input image data. However, provision may also be made that the camera is configured to transmit the image of the calibration representation or camera image data representing this image to a control unit arranged externally with respect to the camera and having an image evaluation device, wherein the corresponding image evaluation may be performed by this control device. Irrespective of the arrangement of the image evaluation device, it may be configured to transmit the at least one first transformation rule to a control unit of the background display device.

In some embodiments, the background display device and the camera may have a respective interface via which the camera and the background display device are in communication with one another. The camera may be configured to transmit information about the calibration representation to the background display device, wherein the background display device may be configured to display the calibration representation in dependence on the information received.

In such embodiments, the camera may thus be configured to request the display of a calibration representation to then be able to image it and to enable a determination of the at least one first transformation rule. In this regard, the camera may so-to-say control or initiate the calibration method and may, for example, request the display of different color values in order to compare how these color values are imaged. The control device of the background display and recording system, in particular an image evaluation device of the camera, may in particular determine the at least one first transformation rule by such a comparison. The determined at least one first transformation rule may further likewise be transmittable to a control unit of the background display device via the interfaces.

In some embodiments, the control device, in particular the camera, may comprise an image evaluation device that is configured to compare the image of the calibration representation with the calibration representation and to determine the first transformation rule. As already explained, this may in particular take place by comparing respective color values.

In some embodiments, the control device may be configured to determine the second transformation rule. This may, for example, in particular with knowledge of the first transformation rule, take place by a calculation or by looking it up in a look-up table. Alternatively thereto, the control device may, however, also be configured to control the background display device to illuminate a real calibration object in order to determine the second transformation rule based on a comparison of the calibration object imaged by the camera with the real calibration object and in particular with its color. Here, too, the second transformation rule may, for example, be determined by a corresponding component of the control device within the camera or by a component which is external with respect to the camera and to which the camera transmits the images of the calibration object and/or corresponding camera image data.

In some embodiments, the control device may further be configured to perform the above-explained method of recording a representation of a virtual background and a real subject in a virtual image recording studio by the background display and recording system.

Said control device, said control unit, and/or said image generator may, for example, comprise one or more of the following apparatus that are connected to one another in a technical signal manner: an integrated circuit, a central processing unit (CPU), a microcontroller, a field programmable gate array (FPGA), or an application specific integrated circuit (ASIC).

In some embodiments, the control device may be configured to determine and to output a setting instruction for an associated illumination apparatus, in particular a spotlight, which is configured to generate illumination light with an adaptable emission spectrum, in dependence on the at least one first transformation instruction and/or in dependence on the at least one second transformation instruction. The emission spectrum of the illumination apparatus may in particular be adapted to the emission spectrum of the background display device by this setting, for which purpose in particular a setting instruction for the illumination apparatus determined during the calibration method may be implemented during the recording. For example, the control device may be configured to output the setting instruction determined during the calibration method to a memory so that the setting instruction may be used during a subsequent recording and the illumination apparatus may be controlled accordingly. Alternatively or additionally, the control device may, however, also be directly connected to the illumination apparatus in order to control the illumination apparatus in accordance with the setting instruction to generate a corresponding emission spectrum.

The invention will be explained in the following purely by way of example with reference to an embodiment and to the drawings.

Figure 2:
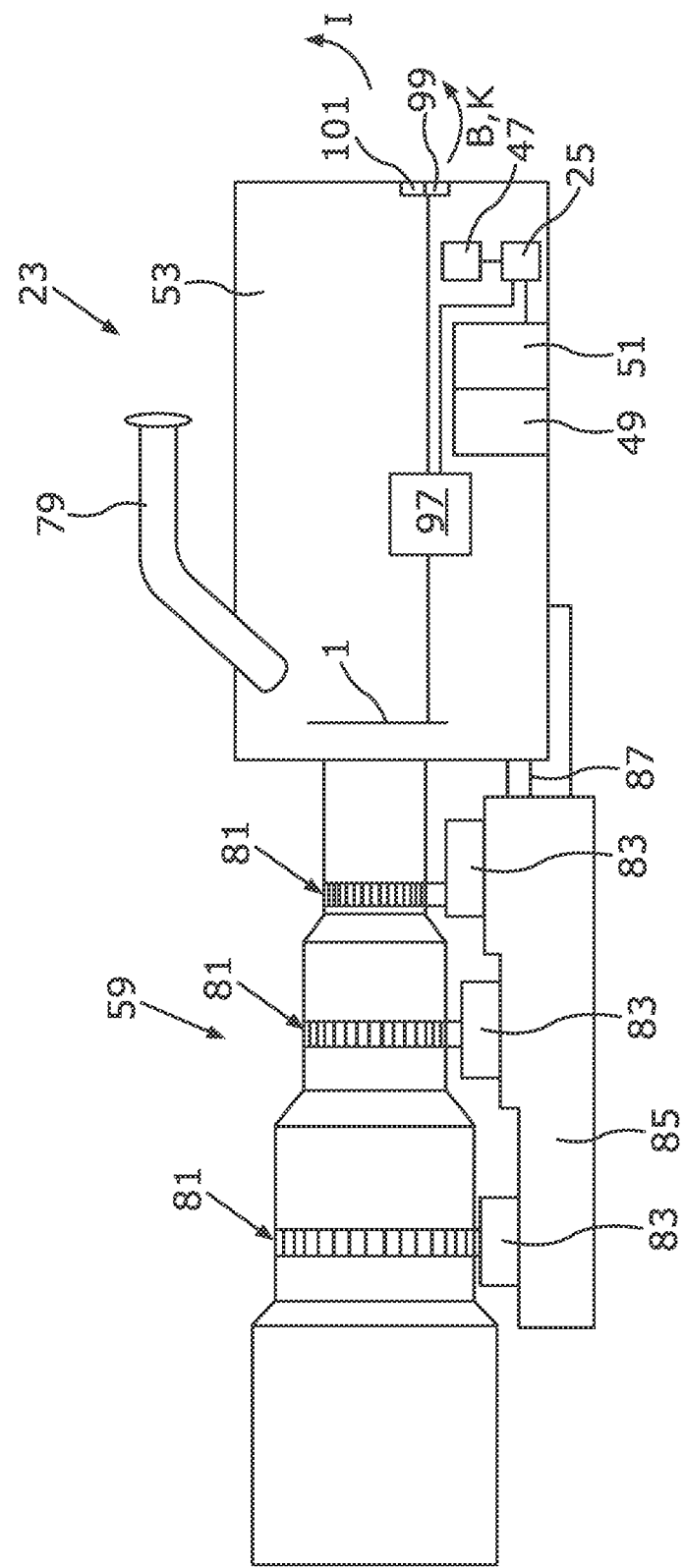
Figure 3A:
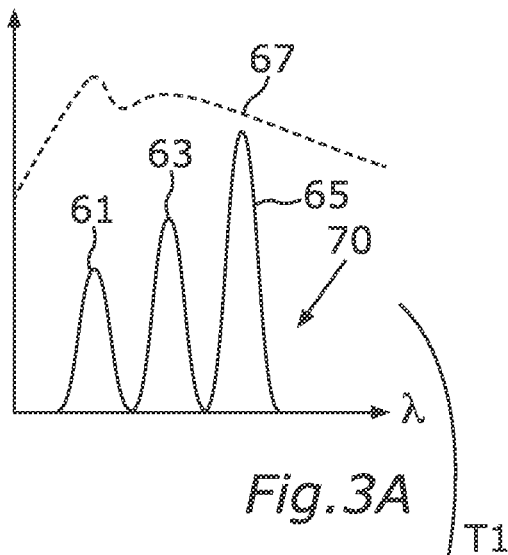
Figure 3B:
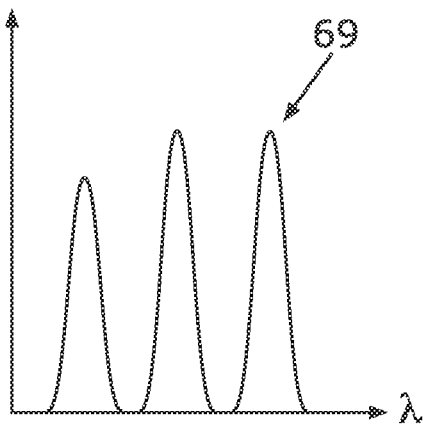
Figure 3C:
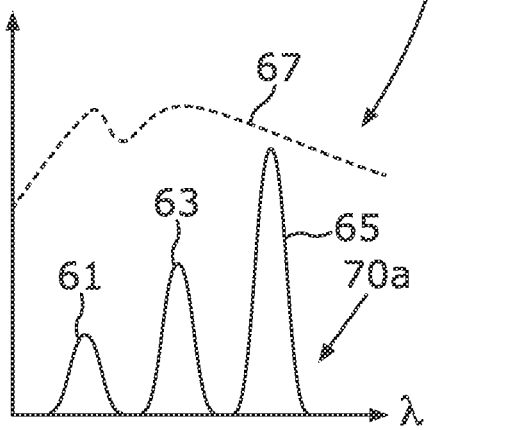
Figure 3D:
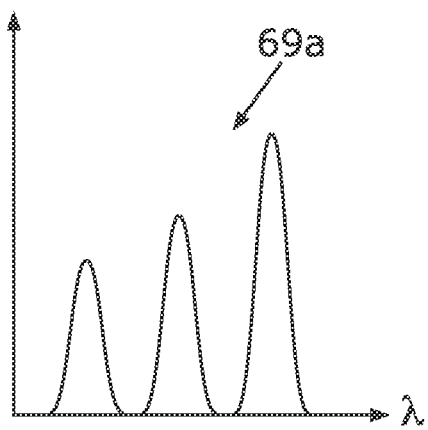
Figure 4:
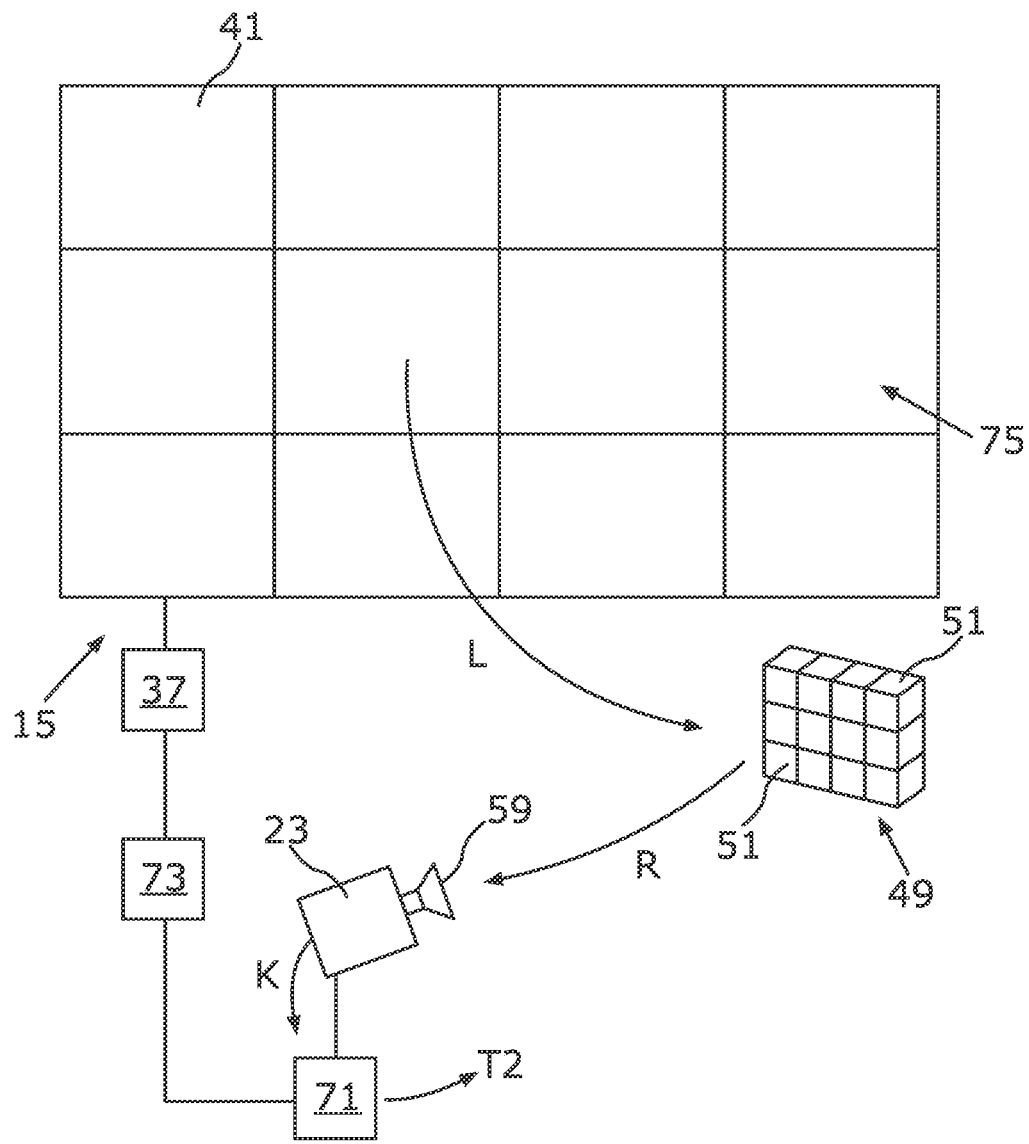

There are Shown:

FIG. 1 a schematic representation of a virtual image recording studio with a background display and recording system that comprises a background display device and a camera;

FIG. 2 a schematic representation of the camera;

FIGS. 3A-3D schematic representations of an emission spectrum of the background display device and of the spectrum imaged by means of the camera to illustrate the determination of a first transformation rule that may be applied to approximate the spectra to input image data received at the background display device; and FIG. 4 a schematic representation of the background display device during an illumination of a real calibration object that is imaged by the camera to determine a second transformation rule that may be applied to camera image data generated by the camera.

FIG. 1 schematically shows a virtual image recording studio 13, in which a scene, in particular in the form of a moving image recording and/or a still image recording, may be recorded by an associated camera 23. The camera 23 may, for example, be designed as a moving image camera in order to be able to carry out moving images recordings that may be stored as a series of images generated by the camera 23. For this purpose, the camera 23 has a lens 59 (also referred to as an objective) that may in particular be designed as an interchangeable lens (also referred to as an interchangeable objective) and that may selectively be connected to a housing of the camera 23. As a result, a respective lens 59, optimally adapted to the environment in the image recording studio 13, may always be used to be able to generate the best possible recordings. An image sensor 1 comprising a plurality of light-sensitive sensor elements may in particular be arranged in the housing of the camera 23, onto which sensor elements light, which enters via a diaphragm aperture of a diaphragm (also referred to as an aperture stop), may be guided by a lens system or at least one lens to generate an image (cf. FIG. 2).

Furthermore, a background display device 15 is arranged in the image recording studio 13 and, together with the camera 23, forms a background display and recording system 10. The background display device 15 comprises an active illumination apparatus 31 configured as an LED wall 33 and is configured to display a representation 19 of a virtual background 21 for a recording by the camera 23. For this purpose, the illumination apparatus 31 or the LED wall 33 has a plurality of actively illuminating light sources 35 that are arranged next to one another in a two-dimensional arrangement. For example, the light sources 35 may be configured as individually controllable light-emitting diodes 44 or as individually controllable light-emitting diode units, wherein each light-emitting diode unit of this kind may comprise a plurality of light-emitting diodes 44, in particular three light-emitting diodes 44. Provision may in particular be made that the light sources 35 are configured as light-emitting diode units having three respective light-emitting diodes 44, wherein one of the three light-emitting diodes 44 may emit red light, one light-emitting diode 44 may emit green light, and one light-emitting diode 44 may emit blue light. The light-emitting diode unit may furthermore comprise a color mixer to be able to set a respective color and/or brightness emitted by the light source 35 by a respective individual control of the light-emitting diodes 44 of a light-emitting diode unit. The light-emitting diodes 44 may, for example, be configured as LEDs or as organic light-emitting diodes 44 or OLEDs. Background display devices for displaying a representation of a virtual background that generate the representation by a rear projection may generally also be used in the image recording studio 13.

The background display device 15 further comprises a plurality of panels 41. A respective plurality of the actively illuminating light sources 35 are arranged at each panel 41 of the plurality of panels 41 so that a section of the representation 19 of the virtual background 21 may be displayed at each of the panels 41. The panels 41 are in particular rectangular and/or square and formed without edges so that the representation 19 of the virtual background 21 may also be displayed without visible interruptions at the transitions between panels 41. The panels 41 are further arranged in a two-dimensional matrix to form the background display device 15. In this regard, the active illumination apparatus 31 comprises a plurality of panels 41 in the embodiment shown.

The representation 19 of the virtual background 21 here reflects, for example, a three-dimensional scene 43 with objects 91, 92, 93 and 94, three trees and a path, which may be generated by an appropriate control of the light sources 35, in particular by an appropriate setting of their respective color and brightness. The three-dimensional scene 43 is projected onto the essentially two-dimensional arrangement of the light sources 35 of the illumination apparatus 31, wherein in particular the objects 91, 92, and 93 appear at a different distance from the illumination apparatus 31 or the background display device 15 in order to reproduce the three-dimensionality of a real background corresponding to the virtual background 21.

The representation 19 of the virtual background 21 by means of the background display device 15 in particular serves to generate a background for a recording of a real subject 17, for example an actor, in front of which a recording may take place or a film scene may be played. As a result, basically any kind of landscapes, spaces or environments may be created in the image recording studio 13, in front of, or, in which, a scene, for example, for a movie, is to be filmed. It is furthermore possible, by a time-variable control of the light sources 35, to show movements in the virtual background 21, for example a passing car, to which the actor 17 may react in an easy and improved manner compared to acting in front of a green screen.

The background display device 15 extends here essentially in the vertical direction so that the actor 17 may move in front of the virtual background 21. However, in order to be able to depict the virtual background 21 more extensively, the background display device 15 may also extend around or above the actor 17, wherein the background display device 15 may in particular have a horizontal orientation above the actor 17. To be able to surround the actor 17 or to produce a transition from the vertical orientation shown to a horizontal orientation, the background display device 15 or the illumination apparatus 31 or the LED wall 33 may also be at least sectionally arched or curved.

In addition to representing the virtual background 21, the background display device 15 may also serve to illuminate the real subject 17 and may thereby, for example, support an illumination apparatus 105 that has a spotlight 107 and that is provided as further studio lighting of the image recording studio 13 and for generating an illumination light C. By illuminating the real subject 17 by the background display device 15, the interaction of the real subject 17 or the actor 17 with light sources present in the virtual background 21, for example, lanterns or lamps, may in particular be improved in that the real subject 17 casts a shadow that corresponds to the light conditions visible in an image generated by the camera 23. The illumination apparatus 105 may, on the other hand, be provided to produce generally adequate light conditions for a recording in the virtual image recording studio 13. For this purpose, the illumination apparatus 105 may be configured to emit light with different emission spectra or in different colors in dependence on a respective setting to be able to perform recordings under different light conditions. In particular, the illumination apparatus 105 may, however, also be configured to emit an emission spectrum of a white color that replicates a natural light spectrum to be able to provide natural-looking illumination in the virtual image recording studio 13.

To be able to generate the representation 19 of the virtual background 21 and to control the light sources 35 to display the representation, the background display device 15 has a control unit 37 that is connected to a memory 39. A model of the virtual background 21 may in particular be stored in the memory 39 so that the control unit 37 may generate the virtual background 21 and corresponding input image data E, which represent the representation 19, based on the model. Furthermore, the control unit 37 may be configured to project the virtual background 21 onto the background display device 15 and in particular the two-dimensional arrangement of the light sources 35. In this regard, the control unit 37 forms a component of a control device 73 of the background display and recording system 10 that furthermore comprises an image evaluation device 71 arranged in the camera 23 by way of example.

The background display device 15 further has an interface 103 and the camera 23 has an interface 101 via which information I may in particular be transmittable from the camera 23 to the background display device 15. The control unit 37 of the background display device 15 may in particular be configured to control the active illumination apparatus 31 in dependence on information I received from the camera 23, as explained in more detail below.

A possible embodiment of the associated camera is schematically shown in FIG. 2. The camera 23 has a camera body 53 to which a lens 59 is fastened. The lens 59 may in particular be configured as an interchangeable lens so that lenses 59 of different kinds may be selectively connected to the camera body 53 and a lens 59 that is optimal for a respective recording may always be selected. The lens 59 has three lens rings 81 by which the respective parameters of the lens 59 may be set. For example, a focusing distance, a focal length, a zoom factor, and/or a diaphragm aperture, in particular an aperture of an iris diaphragm, may be settable or adaptable by rotating a respective one of the lens rings 81. The camera 23 may in particular be configured as a motion picture camera or moving image camera to be able to consecutively generate a sequence of images that may, for example, be played as a film.

To be able to adjust the lens rings 81, a lens ring drive unit 85 is connected to the camera body 53 via a holding rod 87 and comprises a respective lens setting motor 83 for each of the lens rings 81. The lens rings 81 may be rotated by these lens setting motors 83 and adjustments to the lens 59 may be made as a result. In particular, the lens ring drive unit 85 may be remotely actuable so that said lens parameters may be set or changed remotely.

Furthermore, a display device 49 is arranged at the camera body 53 via which information about settings of the camera 23 may be displayed to a user. The display device 49 may in particular be a display. The camera 23 furthermore has an input device 51 which is arranged at the camera body 53 and via which the user may make settings of the camera 23. An exposure time of the camera 23 may in particular be settable at the input device 51, wherein a control device 25 connected to the input device 51 may be configured to control the camera 23 in accordance with the input exposure time. The display device 49 and the input device 51 may in particular be formed by a touch screen via which both information may be displayed to the user and user inputs may be received.

To generate images through light incident through the lens 59, the camera 23 further has an image sensor 1 arranged within the camera body 53. This image sensor 1 may be configured based on, for example, CMOS technology or CCD technology and comprise a plurality of light-sensitive sensor elements that may be arranged in a plurality of rows and columns. To be able to generate color information by means of such an image sensor 1, the sensor elements may have a respective color filter, wherein the color filters may, for example, be arranged in accordance with a Bayer pattern known from the patent document U.S. Pat. No. 3,971,065 A.

Furthermore, the camera 23 has a readout circuit 97 that is configured to read out and process the signals of the respective sensor elements, to digitize them into respective camera data K, and to output them to or via a signal output 99. For this purpose, the readout circuit 97 may in particular comprise amplifiers, multiplexers, analog-digital converters, buffer memories, and/or microcontrollers. Ultimately, an image data set B may thus be generated by the camera 23, which corresponds to the image or an image of a field of view of the camera 23, and the image data set B may be output via the signal output 99. To be able to check the field of view of the camera 23 and to align the camera 23 to a respective image section, a viewfinder 79, through which a camera operator may look, is also arranged at the camera body 53. Furthermore, the control device 25 is connected to a memory 47 and may, for example, be configured to selectively write the image data set B to the memory 47 or to output it via the signal output 99.

While representations 19 of any desired virtual backgrounds 21 may generally be displayed by such a background display device 15 to be able to record scenes in generally any desired virtual environments in the virtual image recording studio 13, there is a problem with such background display and recording systems 10 that the representation 19 of the virtual background 21 is displayed with an artificial emission spectrum that is predefined by the light sources 35 and that differs from a light spectrum in a real background which corresponds to the virtual background 21 and in which natural light conditions prevail. The light sources 35 may indeed be controlled such that this difference is not perceptible to a human viewer and the displayed representation 19 appears natural, but unwanted effects may occur in the image of the representation 19 of the virtual background 21 generated by the camera 23 due to this deviation from a natural light spectrum.

The light-sensitive sensor elements of the camera 23 may in particular have a respective sensitivity spectrum in accordance with which the light-sensitive sensor elements convert incident light into image signals. The sensor elements, which may also be referred to as pixels of the image sensor 1, may be provided with respective color filters so that narrow-band sensitivity spectra may be predefined for individual sensor elements and the sensor elements may be sensitive to specific wavelengths. Based on the signals of the sensor elements, the imaged colors may be determined in accordance with a camera transformation rule, wherein this camera transformation rule may in particular start from an image under natural light conditions. However, if the sensitivity spectra do not match the emission spectra of the light sources 35, shifts may occur between the emitted light spectrum at the background display device 15 and the imaged light spectrum, as illustrated by FIGS. 3A and 3B.

FIG. 3A schematically shows an artificial quasi-white light spectrum that may be generated by means of the background display device 15. For this purpose, a first emission spectrum 61, a second emission spectrum 63, and a third emission spectrum 65 are mixed, wherein the first emission spectrum 61 may, for example, be generated by a blue light-emitting diode 44, the second emission spectrum 63 may be generated by a green light-emitting diode 44, and the third emission spectrum 65 may be generated by a red light-emitting diode 44 so that the emitted light spectrum 70 results from the superposition of the narrow-band emission spectra 61, 63, and 65. Even though the light emitted by the superposed emission spectra 61, 63, and 65 may appear to a human observer to be natural white light, the light generated at the background display device 15 obviously deviates from a continuous white light spectrum 67 of natural light schematically illustrated by the dashed line.

However, the sensitivity spectra of the light-sensitive sensor elements of the camera 23 may be configured for a recording under natural light conditions, i.e. assuming the natural light spectrum 67, so that the sensitivity spectrum of the image sensor 1 as a whole may replicate the light spectrum 67. The light-sensitive sensor elements or the image sensor 1 may therefore be particularly sensitive to those wavelengths λ at which the natural light spectrum 67 reaches a maximum.

As FIG. 3B shows, the superposition between the emitted light spectrum 70 and the sensitivity spectrum of the light-sensitive sensor elements of the camera 23 that replicates natural light 67 may cause the emission spectra 61 and 63 to be amplified with respect to the emission spectrum 65 in the spectrum 69 imaged by the camera 23 so that the spectrum 69 imaged by the camera 23 differs from the light spectrum 70 produced at the background display device 15 by the light spectra 61, 63, and 65 and a color shift occurs.

To address this problem, the control device 73 of the background display and recording system 10 is configured to control the background display device 15 to display at least one calibration representation 75, wherein, as FIG. 4 illustrates, a unicolored white representation may, for example, be displayed as the calibration representation 75. This calibration representation 75 may be imaged by means of the camera 23, wherein the control device 73 may be configured to determine, based on the image of the calibration representation 75 generated by the camera 23, at least one first transformation rule T1 that relates to the control of the background display device 15. This first transformation rule T1 is in this respect determined such that the representation 19 of the virtual background 21 may be captured by the camera 23 as in natural light conditions.

To display the unicolored white calibration representation 75 in the background display device 15, the light sources 35 may be controlled to produce artificial white light by mixing the emission spectra 61, 63, and 65. The camera 23 may image the calibration representation 75 and may transmit it to the image evaluation device 71 so that the latter may, in the image, in particular compare the color defined by the imaged light spectrum 69 (cf. FIG. 3B) with the color that is expected or that is defined by the emitted spectrum 70. Due to this comparison, the first transformation rule T1 may then be determined by the control device 73 of the background display and recording system 10 and/or by the image evaluation device 71 that may also be arranged in the camera 23.

In this respect, the first transformation rule T1 may in particular be applied to the input image data E that represent the virtual background 21. As FIG. 3C illustrates, in the illustrated example, the first transformation rule T1 may be selected such that when a display of white light or of input image data E representing white light is requested, the contributions of the emission spectrum 61 and the emission spectrum 63 are reduced with respect to the contribution of the emission spectrum 65 so that the transformed emission spectrum 70a is displayed at the background display device 15 instead of the emission spectrum 70 that is actually requested. If this emission spectrum 70a is then imaged by means of the camera 23, the imaged emission spectrum 69a corresponds to the originally expected emission spectrum 70 so that a human observer of the image generated by the camera 23 gains the impression of natural white light.

To determine the first transformation rule T1, a plurality of calibration representations 75 may generally also be displayed at the background display device 15. Thus, provision may, for example, be made to display a red calibration representation, a green calibration representation, a blue calibration representation, and a white calibration representation and to image them by means of the camera 23 to determine the first transformation rule T1 by comparing the respective generated calibration representations and the imaged calibration representations. Respective color values of the displayed calibration representation 75 and the imaged calibration representation may in particular be compared with one another for this purpose and may in particular be determined by a respective maximum of the displayed and the imaged light spectrum.

The camera 23 may further be configured to transmit information I about the calibration representation 75 to the control unit 37 of the background display device 15 via the interfaces 101 and 103 and to so-to-say request the calibration representation 75. For example, the camera 23 may transmit input image data E representing the calibration representation 75 to the control unit 37 or may request the display of a specific color value to then be able to check how this color value is imaged. Furthermore, when the first transformation rule T1 is determined in the camera 23, it may also be transmitted to the control unit 37 via the interfaces 101 and 103 so that the control unit 37 may apply the first transformation rule T1 to the input image data E that represent the representation 19 of the virtual background 21.

However, a further problem is that due to the emission spectrum 70 changed with respect to the natural light, the real subject 17 may also appear different in an image generated by the camera 23 than in an image under natural light conditions. The real subject 17 is illuminated by the background display device 15 so that the light emitted by the background display device 15 is reflected by the real subject 17 and this reflection is imaged by the camera 23. Due to the spectral differences from natural light, colors of the real subject 17 may thus in particular appear changed compared to an illumination by natural light.

To also address this problem, a second transformation rule T2 may be determined that may be applied to the camera image data K generated by the camera 23. This may, for example, take place with knowledge of the emission spectra 61, 63, and 65 of the light source 35 of the background display device 15 and/or with knowledge of the first transformation rule T1 by a calculation or by looking it up in a look-up table that may, for example, be stored in the memory 39. Calculation instructions for calculating the second transformation instruction T2 may also be stored in the memory and the control device 73 may be configured to calculate the second transformation instruction T2 based on the calculation instructions.

As an alternative to a calculation or a look-up, as FIG. 4 shows, the control unit 37 of the background display device 15 may be configured to control the background display device 15 to illuminate a real calibration object 49 that is configured here as a color chart having a plurality of color regions 51 that have a color that is clearly defined with respect to an illumination by natural light conditions. An illumination L generated by the background display device 15 is thus incident on the calibration object 49 that reflects this illumination L so that the camera 23 may record the reflection R. The image of the real calibration object 49 generated by the camera 23 may then be made available to the image evaluation device 71 that may compare the colors in the image with the colors of the respective color regions 51. If a deviation is determined during this comparison, a second transformation rule T2 may be determined. The second transformation rule T2 may be applied to the camera image data K generated by the camera 23 such that the colors of the imaged calibration object 49 correspond to the defined colors of the color regions 51, i.e. the colors on an illumination by natural light.

During a recording of a scene in the virtual image recording studio 13, the first transformation rule T1 may, for example, be applied to the input image data E so that the representation 19 of the virtual background 21 may be imaged by the camera 23 as would be expected in an image of a real background which corresponds to the virtual background 21 and in which natural light conditions prevail. The second transformation rule T2 may, on the other hand, be applied to the camera image data K that represent the real subject 17 so that the real subject 17 may also be imaged by the camera 23 as under natural light conditions in the virtual image recording studio 13. For this purpose, metadata may, for example, be generated that associate a respective picture element in the image generated by the camera 23 either with the virtual background 21 or with the real subject 17. For this purpose, the application of the second transformation rule T2 may, for example, take place within the camera 23 or externally, in particular during post-production.

As an alternative to a separate application of the second transformation rule T2 to a region in the image generated by the camera 23, provision may also be made that the transformation rules T1 and T2 are matched to one another during the calibration such that the transformation rule T1 may be applied to all the input data E and the transformation rule T2 may be applied to all the camera image data K to be able to generate, by means of the camera 23, an image that appears like an image under natural light conditions. For this purpose, the steps explained above for determining the transformation rules T1 and T2 may, for example, be iteratively applied while applying respective previously determined transformation rules T1 and T2 in order thereby to determine a respective pair of transformation rules T1 and T2 during whose application the desired natural effect is achieved.

Furthermore, the control device 73 may be configured to determine a setting instruction A for the illumination apparatus 105 in dependence on the first transformation instruction T1 and/or the second transformation instruction T2 in order to set the illumination apparatus 105 accordingly during the recording (cf. FIG. 1). An emission spectrum of the illumination apparatus 105 may hereby be adapted to the emission spectrum 70a emitted by the background display device 15 while applying the first transformation rule T1, in particular to a spectrum of a white light emitted by the background display device 15. It may thereby be achieved that the real subject 17 reflects light emitted by the illumination apparatus 105 in a similar manner to light emitted by the background display device 15 so that, by applying the second transformation instruction T2, the real subject 17 may be imaged with the colors expected in natural light conditions irrespective of whether the camera 23 absorbs light emitted by the background display device 15 or by the illumination apparatus 105.

REFERENCE NUMERAL LIST

1 image sensor
10 background display and recording system
13 image recording studio
15 background display device
17 real subject, actor
19 representation
21 virtual background
23 camera
31 illumination apparatus
33 LED wall
35 light source
37 control unit
39 memory
41 panel
43 three-dimensional scene
45 light-emitting diode
47 memory
49 calibration object
51 color region
53 camera body
59 camera lens, interchangeable lens
61 first emission spectrum
63 second emission spectrum
65 third emission spectrum
67 natural light spectrum
69 imaged spectrum
69a imaged transformed spectrum
70 emitted light spectrum
70a transformed light spectrum
71 image evaluation device
73 control device
75 calibration representation
79 viewfinder
81 lens ring
83 lens setting motor
85 lens ring drive unit
87 holding rod
91 first object
92 second object
93 third object
94 fourth object
97 readout circuit
99 signal output
101 interface
103 interface
105 illumination apparatus
107 spotlight
A setting instruction
B image data set
C illumination light
E input image data
K camera image data
L illumination
R reflection
T1 first transformation rule
T2 second transformation rule

The invention claimed is:

1. A method of calibrating a background display and recording system comprising a background display device and a camera, wherein the background display device is configured to display, behind or above a real subject, a representation of a virtual background for a recording in a virtual image recording studio, wherein the background display device has a plurality of light sources that generate light in a plurality of different emission spectra, and wherein the camera is configured to image the representation of the virtual background and the real subject during a recording, wherein the camera has an image sensor having a plurality of light-sensitive sensor elements to convert incident light in accordance with a plurality of different sensitivity spectra into image signals,
comprising the steps:
displaying at least one calibration representation by the background display device and generating an image of the at least one calibration representation by the camera;
determining at least one first transformation rule based on the image of the calibration representation, wherein the at least one first transformation rule relates to the control of the background display device;
determining at least one second transformation rule, wherein the at least one second transformation rule relates to a color transformation of camera image data of the camera,
wherein the camera image data represent the image generated by the camera,
wherein the at least one first transformation rule and the at least one second transformation rule are determined such that the representation of the virtual background can be captured by the camera as in natural light conditions in the virtual background and such that the real subject can be captured by the camera as in natural light conditions in the virtual image recording studio.

2. A method in accordance with claim 1,
wherein the at least one first transformation rule relates to a color transformation of colors displayed by the background display device.

3. A method in accordance with claim 1,
wherein the calibration representation is unicolored or multicolored.

4. A method in accordance with claim 1,
wherein, for determining the at least one first transformation rule, a first calibration representation, a second calibration representation, a third calibration representation, and a fourth calibration representation are displayed and imaged, wherein the colors of the calibration representations differ from one another, and wherein the at least one first transformation rule is determined based on the images of the calibration representations.

5. A method in accordance with claim 1,
wherein, for determining the at least one first transformation rule, color values in the image of the calibration representation are compared with color values of the displayed calibration representation.

6. A method in accordance with claim 1,
wherein information about the at least one calibration representation is transmitted from the camera to the background display device, and wherein the calibration representation is displayed in dependence on the transmitted information.

7. A method in accordance with claim 1,
wherein the at least one second transformation rule is calculated or looked up in a look-up table in dependence on the at least one first transformation rule.

8. A method in accordance with claim 1,
wherein the determination of the at least one second transformation rule comprises the steps:
illuminating a real calibration object by the background display device and generating an image of the illuminated calibration object using the camera; and
determining the at least one second transformation rule based on the image of the calibration object.

9. A method in accordance with claim 8,
wherein, for determining the at least one second transformation rule, at least one color of the calibration object in the image is compared with the color of the real calibration object.

10. A method in accordance with claim 9,
wherein the at least one second transformation rule is determined such that the color in the image is approximated to the color of the real calibration object.

11. A method in accordance with claim 8,
wherein the calibration object has a color chart on which a plurality of defined colors are displayed, wherein, for determining the at least one second transformation rule, the colors in the image are compared with the colors on the color chart.

12. A method in accordance with claim 8,
wherein the background display device is controlled to illuminate the calibration object while applying the at least one first transformation rule.

13. A method in accordance with claim 1,
wherein the at least one first transformation rule and the at least one second transformation rule are matched to one another such that both the representation of the virtual background and the real subject are imaged by the camera as under natural light conditions when the at least one first transformation rule and the at least one second transformation rule are applied.

14. A method in accordance with claim 13,
wherein the at least one first transformation rule and the at least one second transformation rule are matched to one another by generating images while applying the first transformation rule and the second transformation rule and by iteratively adapting at least one of the first transformation rule or the second transformation rule.

15. A method in accordance with claim 1,
wherein a plurality of first transformation rules and a plurality of second transformation rules are determined, wherein a pair of a first transformation rule and a second transformation rule is selected from the plurality of first transformation rules and the plurality of second transformation rules such that, when applying the first transformation rule and the second transformation rule, both the representation of the virtual background and the real subject are imaged by the camera as under natural light conditions.

16. A method in accordance with claim 1,
wherein a setting instruction for an associated illumination apparatus, which is configured to generate an illumination light with an adaptable emission spectrum, is determined in dependence on at least one of the at least one first transformation instruction or the at least one second transformation instruction.

17. A method of recording a representation of a virtual background and a real subject in a virtual image recording studio by a background display and recording system,
in which the representation of the virtual background is displayed behind or above the real subject by a background display device and the representation of the virtual background and the real subject are imaged by a camera,
in which the background display and recording system is calibrated in accordance with a method in accordance with claim 1, and
in which the first transformation rule and the second transformation rule are applied when recording the representation of the virtual background and the real subject.

18. A method in accordance with claim 17,
wherein input image data to be displayed at the background display device are transformed and displayed using the first transformation rule.

19. A method in accordance with claim 17,
wherein the second transformation rule is applied to all the image data generated by the camera,
or
wherein the second transformation rule is only applied to camera image data that represent the real subject.

20. A background display and recording system for a virtual image recording studio,
comprising a background display device and a camera,
wherein the background display device is configured to display, behind or above a real subject, a representation of a virtual background for a recording in the virtual image recording studio, and wherein the camera is configured to image the representation of the virtual background and the real subject,
wherein the background display and recording system has a control device that is configured to perform the calibration method in accordance with claim 1.

21. A background display and recording system in accordance with claim 20,
wherein the background display device and the camera have a respective interface via which the camera and the background display device are in communication with one another, wherein the camera is configured to transmit information about the calibration representation to the background display device, wherein the background display device is configured to display the calibration representation in dependence on the information received.

22. A background display and recording system in accordance with claim 20,
wherein the control device comprises an image evaluation device that is configured to compare the image of the calibration representation with the calibration representation and to determine the first transformation rule.

23. A background display and recording system in accordance with claim 20,
wherein the control device is configured to determine and to output a setting instruction for an associated illumination apparatus which is configured to generate illumination light with an adaptable emission spectrum, in dependence on at least one of the at least one first transformation instruction or the at least one second transformation instruction.

* * * * *